I. G. MACFARLANE.
Stove or Furnace Grate.
No. 205,883. Patented July 9, 1878.
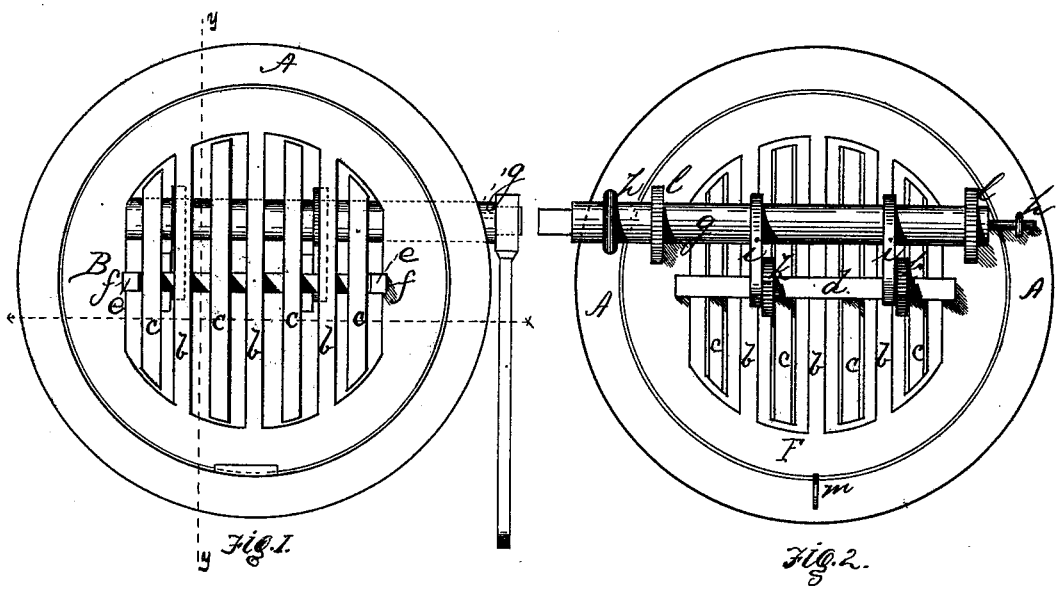
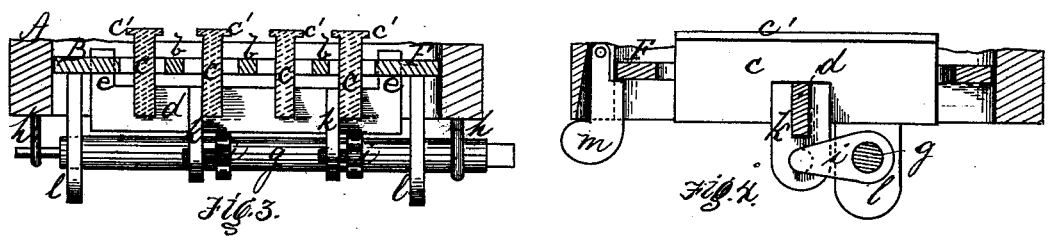
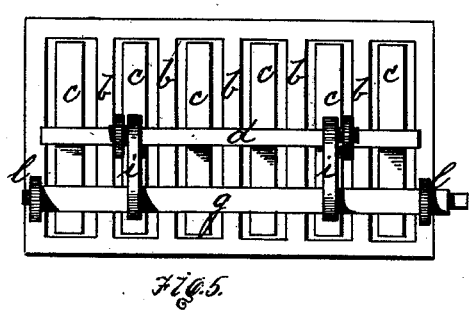

UNITED STATES PATENT OFFICE.

ISAIAH G. MACFARLANE, OF WILKINS TOWNSHIP, ALLEGHENY COUNTY, ASSIGNOR TO JAMES MACFARLANE, OF TOWANDA, PENNSYLVANIA.

IMPROVEMENT IN STOVE OR FURNACE GRATES.

Specification forming part of Letters Patent No. 205,883, dated July 9, 1878; application filed May 20, 1878.

*To all whom it may concern:*

Be it known that I, ISAIAH G. MACFARLANE, of Wilkins township, in the county of Allegheny and State of Pennsylvania, have invented a new and useful Improvement in Combined Dumping and Agitating Grates; and I do hereby declare the following to be a full, clear, and exact description thereof, reference being had to the accompanying drawing, forming part of this specification, in which—

Figure 1 is a top view of a grate embodying my invention. Fig. 2 is a bottom view of the same. Fig. 3 is a vertical section on the line $x\ x$, Fig. 1; Fig. 4, a similar section on the line $y\ y$, Fig. 1. Fig. 5 is a view of the same as applied to square grates, as in some forms of cook-stoves, ranges, &c.

Like letters refer to like parts wherever they occur.

My invention relates to the construction of grates, and is especially adapted for use in cylinder, cook, and other stoves and furnaces, where both an agitating and dumping grate is desirable; and consists, first, in the combination, in a grate, of a series of fixed bars and a series of vertically-reciprocating bars, the latter actuated by crank-arms or equivalents from a simple rock-shaft arranged at one side of the center of the grate, whereby a simple and effective construction is obtained and the ash-pit is but little obstructed; second, in the combination, in a grate, of a series of stationary bars and vertically-reciprocating bars, the latter actuated by a rock-shaft, and the former or fixed bars pivoted on the journal of the rock-shaft, whereby a dumping and agitating grate is obtained, wherein the fixed and movable parts retain their relative positions when the grate is dropped to discharge the coals.

I will now proceed to describe my invention so that others skilled in the art to which it appertains may apply the same.

In the drawing, A indicates the fire-pot of a stove, range, furnace, or like article, and may be cylindrical, polygonal, or of any approved form. B indicates a grate of a suitable shape to close the bottom of and conform to the fire-chamber. This grate B is composed of a series of fixed or stationary bars, $b$, and a series of movable or vertically-reciprocating bars, $c$, which alternate with the fixed bars $b$. The movable bars $c$ are carried upon and connected to a yoke or cross-piece, $d$, each end of which is provided with a guide-rod, $e$, that works in a slot, $f$, in the frame F of the fixed bars, said slot being by preference somewhat larger than the guide-rod $e$, to accommodate the slight lateral play or rocking of rods $e$ due to the manner in which the movable bars are operated.

The movable bars $c$ are formed with overhanging ledges or flanges $c'$, which may be of any desired width, and serve to crush and throw down any clinkers or like substance coming within range of the bars.

$g$ represents a rock-shaft, hung in suitable bearings $h$, attached to the bottom of the fire-chamber or fire-pot A, preferably at one side of the grate or off the center thereof; and on said shaft $g$ are secured crank-arms $i$, provided with pins, which engage with slotted pendants $k$, attached to the cross-piece or yoke $d$ of movable bars $e$.

In order to support the fixed bars $b$ of the grate, and at the same time permit them to swing on the same center as the movable bars, the fixed bars are pivoted on the shaft $g$ by pendants $l$, or equivalent devices.

$m$ indicates a weighted overbalanced catch, pivoted on the fire-pot A at a point opposite the pivoting of the fixed bars, and adapted to lock up the grate B.

The several parts of the grate being constructed and arranged as specified, the movable bars $e$ may be caused to rise and fall for the agitation of the superimposed coals by rotating the rock-shaft $g$ by means of a suitable lever, and the contents of the fire-pot may be readily dumped or discharged by withdrawing catch $m$ and permitting both the fixed and movable bars composing the grate to turn on or with the shaft $g$.

To keep the ash-pit as free from obstruction as possible, and also to protect the operative devices, it is desirable to place the rock-shaft $g$ on one side or off the center, as shown; but the rock-shaft which operates the reciprocating bars and supports the fixed bars might be located at the center, and an equally effective dumping and agitating grate be obtained, though in such case cams and yokes would be preferably used instead of crank-arms *i* and pendants *k*, and a different locking-catch would be preferred for locking up the fixed bars.

The latter construction is not as desirable, for the reason that the fire-pot is more obstructed and the devices less durable.

Having thus described the nature and advantages of my invention, what I claim, and desire to secure by Letters Patent, is—

1. The combination, in an agitating-grate, of the series of fixed bars, the movable bars provided with guide-rods, the single rock-shaft set off the center of the grate, and the cranks for operating the reciprocating bars from the rock-shaft, the whole constructed and operating substantially as and for the purpose specified.

2. In a dumping and agitating grate, the combination of fixed and reciprocating bars, the latter operated from a rock-shaft, and the former pivoted on the rock-shaft, so that both fixed and movable bars can turn on the same center, substantially as and for the purpose specified.

In testimony whereof I, the said ISAIAH G. MACFARLANE, have hereunto set my hand.

ISAIAH G. MACFARLANE.

Witnesses:
F. W. RITTER, Jr.,
A. C. JOHNSTON.